July 23, 1946.  R. L. SKINNER  2,404,664
PRESSURE SEALING-MEANS
Filed May 27, 1944  2 Sheets—Sheet 2

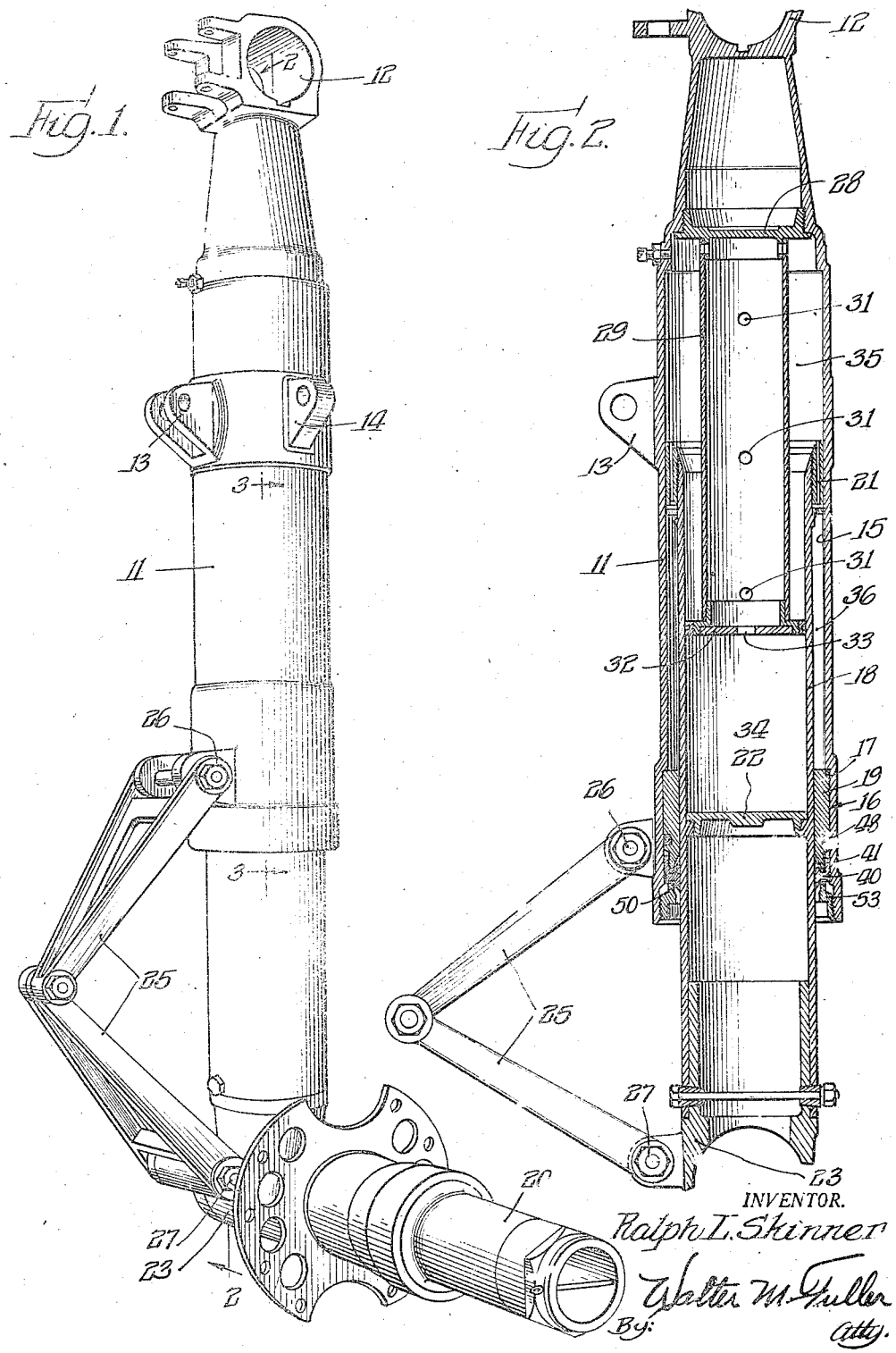

INVENTOR.
Ralph L. Skinner
BY
Walter M. Fuller
atty.

Patented July 23, 1946

2,404,664

UNITED STATES PATENT OFFICE 2,404,664

PRESSURE SEALING MEANS

Ralph L. Skinner, Detroit, Mich., assignor to Renniks Company, Detroit, Mich., a copartnership Application May 27, 1944, Serial No. 537,757

1 Claim. (Cl. 286—26)

The current invention pertains to certain valuable betterments and refinements in fluid-pressure sealing-means for packing-glands of special advantage when employed in connection with the struts of the landing-gears of airplanes, although the invention is not limited or restricted to such particular service, in that the structural and functional features of superiority of suitable embodiments of the invention may be availed of in shock-absorbers for automobiles, sealing means for pump-shafts, globe-valves, etc., and in other relations.

As is well known, aircraft landing-gears include a plurality of rubber-tired wheels, each of which is mounted on the lower portion of a so-called strut which may be swung down into operative position or retracted upwardly into inoperative elevated relation, each such strut, when down in working position comprising a vertically-disposed cylinder within which is slidingly fitted a hollow piston or plunger which extends down out of the end of the cylinder and carries at its lower end the rotatable landing-wheel designed to descend with the airplane into contact with the ground and to roll thereon.

The interior of the hollow, reciprocable piston may be considered as a lower chamber, and the interior of the cylinder in which the piston slides may be regarded as an upper chamber, such lower chamber accommodating a suitable liquid, such as a mineral-oil, and the upper chamber being charged with air under substantial pressure, the wall of such cylinder having a valve-assembly by which the two fluids may be originally admitted into the combined communicating chambers.

The piston-assembly and the cylinder-assembly are slidable longitudinally relatively to one another and these two telescopic tubes are maintained in line by the links of a torque-arm assembly which prevents the piston from turning angularly in the cylinder, the upper end of the latter having suitable means for attachment to the airplane with which the strut is employed.

The lower chamber of these two telescoping members, piston and cylinder, of the shock-absorbing unit, when in operative position, is always filled with the liquid and the upper chamber has the compressed-air in its top portion and some of the liquid in its lower parts, although when the strut is swung up in its substantially-horizontal inactive position both hollow elements may be occupied by both liquid and air.

An oleo-pneumatic shock-absorbing strut of this kind is designed to perform three necessary and important functions during the landing of the airplane as follows: (a) the absorption of the impact-energy of the landing airplane is accomplished by the compression of the air in the upper chamber during the compression stroke of the wheel-carrying piston or plunger; (b) the loads developed in the appliance while the airplane is taxiing are carried mainly by the compressed-air in the upper chamber; and (c) the snubbing effect, which is necessary to prevent quick rebound, is produced by forcing the liquid to pass through restrictions on the expansion stroke of the plunger or piston.

Bearing in mind these essential duties which the strut must perform, remembering that the airplanes are subject to great ranges of atmospheric temperature, and that they encounter water, ice, dust, dirt, mud, etc., it is obvious that to render proper, efficient and effective performance over reasonable periods of time without requiring servicing, a simple, suitable, long-wearing fluid-pressure sealing-gland must be used between the cylinder and plunger to positively prevent leaking of either contained fluid, liquid or air, and without undue friction.

The provision of such an adequate pressure-sealing means remained an aggravating, persistent, expensive, unsolved problem over a long period of years until its answer was comparatively recently discovered and that difficulty overcome by the invention of the novel improvement in this portion of the structure described hereinafter.

The employment of a present desirable embodiment of the current invention in such a landing-gear strut has been illustrated in detail in the accompanying drawings, forming a part of this specification, and to which reference should be had in connection with the following description, like reference numerals being employed in the several views of the drawings to designate the same parts of the structure.

In these drawings:

Figure 1 is a perspective veiw of one such strut;

Figure 2 is a longitudinal section through the same on line 2—2 of Figure 1;

Figure 3:
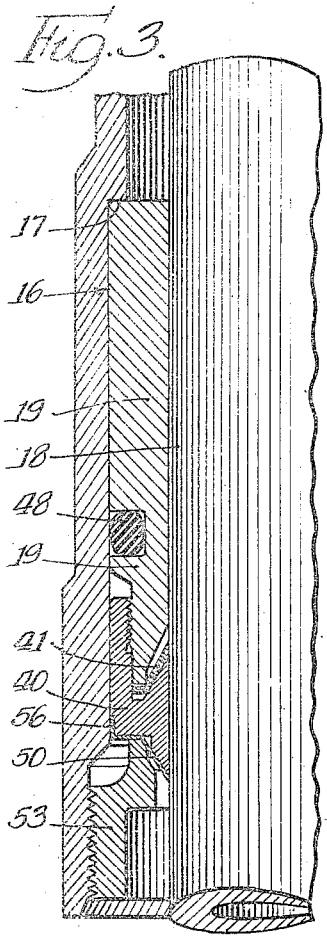
Figure 3 is an enlarged, fragmentary, longitudinal section on line 3—3 of Figure 1.

Referring to these drawings, it will be seen that the airplane strut cylinder 11 is closed at its upper end and open at its lower end, the exterior of the cylinder-assembly having bearings 12, 13, and 14 for attachment, by means not shown, to the airplane for which the strut was designed.

Internally this cylinder has an upper cylindrical space 15 and near the lower end of the cylinder it has an aligned, cylindrical chamber 16 of slightly greater diameter, all as is clearly presented in Figure 2, an annular shoulder 17 being present at the junction of such two spaces.

Cylinder 11 internally accommodates a hollow, metal, cylindrical piston or plunger 18 whose round, outer surface is preferably chromium-plated, ground and highly polished to present an unusually smooth, external, cylindrical surface, the piston having a sliding or reciprocatory fit in an appropriate metal bearing 19 mounted in the lower end portion 16 of the cylinder, such piston or plunger at its upper end having an external, round head 21 with a sliding fit in the smaller chamber 15 of the cylinder.

Intermediate its internal length piston 18 has an imperforate partition-wall 22 (Fig. 2) dividing its interior into two non-communicating chambers, and at its lower end the piston has a member 23 (equipped with a landing-wheel axle 20) mounted thereon to which is hinged at 27 the corresponding end of the torque-arm assembly 25, the upper end of which is hinged at 26 to the lower portion of cylinder 11.

The upper part of the interior of cylinder 11 is closed by a member 28 on which is mounted a depending, stationary plunger-tube 29 apertured at 31, 31 and supporting at its lower end an orifice-plate 32 closing the bottom end of the tube, except for its central aperture 33, and fitting snugly inside of cylindrical chamber of the piston 18.

As will be noted, this orifice-plate separates the lower chamber 34 in the piston and the upper chamber 35 in the cylinder 11, it being this orifice through which liquid passes upwardly into the upper chamber during compression of the strut and through which it returns during extension of the strut.

The initial, upward compression-stroke of the piston occurs when the impact-load of the lending airplane is applied to the landing-gear and under these circumstances, the hollow piston ascends further into the encasing chamber, thus reducing the volume of the lower chamber 34 and forcing liquid to leave such chamber through the orifice-plate, and the liquid, in overcoming the resistance to its flow through such orifice-plate, absorbs the greater portion of the impact-energy of the landing airplane, such energy being converted into heat and dissipated.

As the compression-stroke continues, the liquid level rises above the orifice-plate in chamber 35 having issued through one or more of the ports 31, 31 and a portion flows downwardly through holes in the piston-head 21 and passes a recoil-valve not shown in detail, which remains open during the compression-stroke, into the outer annular chamber 36 between the piston and cylinder, and the rise of the liquid in chamber 35 compresses the air from its nominal value, thus creating further resistance to the telescopic action, compression of the strut stopping when the entire impact-load of the landing aircraft has been absorbed by the liquid and by the compression of the air.

Expansion of the strut takes place after a sufficient compression stroke has been made to absorb the impact-energy of the lending airplane, and, as such load decreases, the air, which has been compressed above the liquid-level, expands causing the strut to elongate, the recoil-valve being closed instantly by the returning liquid, the latter in the outer chamber 36 passing through small holes in the piston-head before it can enter the upper chamber during the extension stroke, the expansion of the strut being slowed due to the restriction of the flow created, this resistance resulting in an effect known as snubbing and rebound is reduced in two ways, first by absorbing energy and second by changing the natural period of fluctuation in such a way that it dampens out tire oscillation.

The elongation of the strut increases the available volume of the lower chamber 34 in the piston below the orifice-plate and this forces the liquid above the orifice-plate to return through such plate into the chamber below the plate, this fluid movement continuing until the air-pressure in the top of the cylinder equalizes the weight of the plane and the ground forces thrusting upwardly, the piston then coming to rest in what is known as the static position, it being understood, of course, that when an airplane lands, oscillation consisting of compression and expansion strokes re-occur with diminishing intensity until the airplane comes to rest.

Inasmuch as struts of this kind or comparable ones must successfully withstand varying pressures sometimes in excess of 3,000 pounds per square inch and must efficiently undergo temperature ranges from minus 70° F. to plus 180° F., it is obvious that a packing-gland of unusual functional properties is required to meet the specified conditions in that such gland must prevent leakage of both oil and air in the static condition of the strut and as well as while undergoing reciprocation, both for indefinite periods of time.

Loss of hydraulic oil from a strut causes frequent servicing and additional expense, besides the possibility of severe damage to the plane or occupants in the event of a large loss of oil in flight; and loss of air will eliminate in most cases the cushioning effect of the strut and hence cause possible damage to the aircraft during landing operations.

In addition, a gland which will perform satisfactorily should have long wearing qualities, it should be relatively simple in structure, it should be substantially inexpensive to produce, it should be of such form as to be comparatively easily placed into position and removed, and it should be non-corrosive and not subject to detrimental effects when subjected to radical temperature changes.

Before the discovery and invention of the new and valuable style of packing-gland constituting the present invention, no available pressure-sealing means was able to meet all the required conditions with reasonable satisfaction, particularly the essential non-leaking properties over a protracting period of time.

Figure 4:
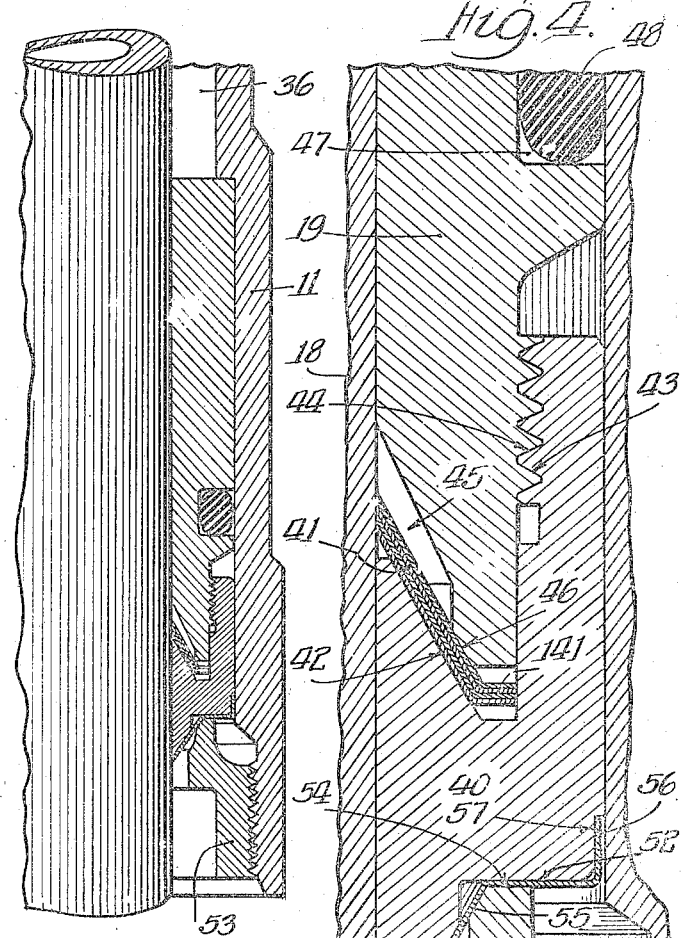
Figure 4 is a detailed section on a still larger scale through the new and improved packing-gland.

As shown most clearly in detail in Fig. 4, one form of such improved pressure-sealing packing-gland comprises a group, four in the present case, of nested or interfitted, face-to-face contacting, resilient, metal, conical reeds 41, 41 resting against, and held fixedly pressed together against, a sloping or oblique, circular shoulder 42 constituting, in this particular case, part of an annular sleeve or collar 40 of the shape in cross-section shown in Fig. 4, and internally screw-threaded at 43, such screw-thread cooperating with a screw-thread 44 on a reduced-diameter end portion of bearing 19, the companion or corresponding terminal portion of the bearing having an annular chamber 45 with a sloping shoulder 46, opposite and parallel to shoulder 42, pressing against the outer portion only of the uppermost or terminal reed 41 of the group, so that the unconfined, inwardly-directed parts of the reeds whose edges are in direct functional engagement with the cylindrical surface of the piston are free to yield or flex slightly by reason of the shortness of the surface 46 and the size of the bearing chamber 45.

As will be appreciated, this mounting of the reeds leaves their terminal portions projecting inwardly with their inner edges pressing on the highly-polished, cylindrical surface of the reciprocatory, hollow piston 18, the angular inclination of the reeds to the axis of the piston, in this particular instance, being about 30°.

As will be readily understood, the liquid under pressure in the annular chamber 36 keeps the bearing 19 adequately supplied with lubricant and its pressure is applied to the exposed inner portion of the reeds which project inwardly lengthwise of the piston toward the source of pressure, so that such applied pressure tends to flex the inner ends of the reeds into firm pressure-sealing engagement with the piston regardless of whether the latter is stationary or sliding. To facilitate the performance of this advantageous function, the foot of the oblique shoulder 42 does not reach quite the end of the superposed reeds.

The interfitted, outwardly-directed portions 141 of the reeds may have their external edges ground to the same diameter so that they accurately contact the adjacent inner surface of the element 40, although this feature of construction is not always necessary or availed of.

Inwardly longitudinally of the bearing 19 beyond the reeds 41 the bearing, which in part constitutes the mounting for the reeds, is provided with a circular peripheral groove 47 around the bearing accommodating a neoprene or other suitable artificial-rubber ring-gasket 48 of normal, substantially-round shape in cross-section slightly larger in diameter than the depth of the groove, so that any of the indicated fluid-pressure which might reach the groove tends to flatten the gasket against both the bottom surface of the groove and also against the inner face of the cylinder, as presented in Figs. 3 and 4, such means constituting an adequate pressure-seal between such static or stationary surfaces.

The reed pressure-confining means is not so simple of production for any particular strut service as might at first appear, as will now be set forth more in detail.

In the first place, the number of reeds to be employed in the gland, whether one or more, is a matter which depends upon the particular conditions of service which the gland must successfully meet.

Then again, the angular slope or inclination of the reeds is of importance since it depends in substantial measure on the flexibility of the reeds.

In order to obtain an efficient seal, the gland should be as flexible as possible, so that if the pressure happens to be low, then the reeds will seal as well as if the fluid pressure were high. Where, if the angle were greater, say up to 60° or more, the cantilever action would be less and require high pressures to seal. In other words, it is a real problem to determine the correct degree of flexibility and the angle to properly care for all pressures which may be present.

As to the metal to be used in the reeds, this is a substantial factor in that it must be (a) tough, (b) of appropriate tensile-strength, (c) of suitable bearing and wearing properties, and (d) possess high resistance to corrosion and rust. Up to the present time, apparently the best metals for this purpose have been beryllium copper alloy and Wm. Chase Co. Alloy No. 720, the latter composed of 20% nickel, 20% manganese and 60% copper, the second alloy being preferable. In order to have a good material with constant tensile-strength and physical properties, it is necessary to control closely and accurately the percentage of beryllium in the berryllium copper alloy, and, since the percentage thereof is quite small, and has to be precise, any variation in the alloying of the metal will result in various finished products which in some cases might be unsatisfactory. Whereas, the relatively large percentages of the three ingredients of the nickel-manganese-copper alloy is such that any small variation in the percentage of the different metals which go to make up the alloy do not affect the finished properties materially.

The specified reeds, as to thickness would ordinarily individually be somewhere between .005 up to .020 inch, but such dimension is subject to modification.

Now as to the sizes of the parts, assuming that the internal-diameter of the cylinder-chamber is from 5.374 to 5.376 inches and that the external-diameter of the piston is from 4.499 to 4.501 inches, that is to say a tolerance of .002 inch in each case, and assuming that the plurality of the reeds have been secured in their mounting, in this case including the bearing, outside of the cylinder and with their outer edges desirably, but not necessarily, in contact with the inner cylindrical surface of the collar 40 and with such collar firmly screwed in place against the reeds, the inner edges of the reeds are ground down to a diameter of 4.496 plus or minus .001 inch diameter so the stepped-edge feature of such reeds is eliminated.

After this these inner edges of the reeds are lapped on a piston, or its equivalent, of the same diameter as the piston to be used in the strut, such lapping being done with a fine optical dust. This lapping operation increases the free diameter of the reeds only about .001 inch and careful measurements will disclose that the diameter of the toe of the reeds is slightly smaller than the diameter of their heel when measured in their free position. Thus the surface of the reeds bearing on the piston in the strut in the slightly-flexed normal relation of the reeds is parallel to the axis of the piston so that the full width of the reeds contacts with the surface of the piston.

It will be understood that after the reeds have been placed in the cylinder and the piston forced through them, there is an interference fit between the two parts owing to their slightly different diameters, the male part being of minor larger diameter than that of the female part.

It will be appreciated that to preserve this fineness and nicety of fit of parts, it is necessary to prevent foreign matter from entering between the reeds and their cooperating highly-finished piston surface.

It will also be understood that the part of the reciprocatory piston exposed to the weather outside of the cylinder is likely to become coated with moisture, ice, dirt, dust and deposit from exhaust-gases and these must not be allowed to remain thereon.

Accordingly, improved and effective means have been provided to accomplish this result and to protect the piston and its complementary or companion gland-reeds.

The opposite outer or lower end of the threaded collar or sleeve 40 is in somewhat similar manner provided with one or more downwardly, inwardly-converging, conical, metal reeds 50, in the present instance one, similar to those previously referred to, bearing on an annular, conical surface 51 of part 40, comparable to the opposite surface 42 of the collar, and also on a second, outstanding surface 52 at a right-angle to the axis of the collar.

This reed, or plurality of nested reeds, if more than one is employed, is held firmly in the specified relation by another annular, externally-screw-threaded collar 53, screwed into the threaded mouth of the lower end of the cylinder 11, such second collar having a surface 54 pressing the outstanding part of the reed against the shoulder 52 and an adjacent inclined surface 55 contacting the reed outwardly beyond the shoulder 51.

If preferred, the extreme outer portion of the reed may have a circular part 56 occupying a groove 57 in the surface of the collar 40.

This one or more reeds or scraper-blades 50 are desirably ground and lapped as in the other case.

As will be readily understood from what precedes the collar 40 is screwed on to the bearing 19 by means of a spaner-wrench occupying holes not shown and holds the reeds 41 in proper place, the second collar 53 being screwed into the threaded mouth of the cylinder by a spaner-wrench temporarily fitted in holes not illustrated and holding the one or more reeds 50 in place firmly by demountably maintaining the bearing 19 against the cylinder shoulder 17, any suitable means being employed to prevent unintentional loosening of the two threaded collars.

By having the packing-gland near the lower end of the cylinder, the bearing 19 above it is always supplied with clean lubricant from above, and, of course, the scraper or wiper 50 keeps the reciprocatory piston clean and free from objectionable foreign matter.

Figure 5:
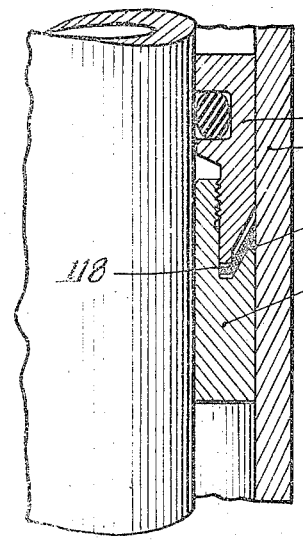
Figure 5 is a somewhat modified construction on a smaller scale.
Figure 6:
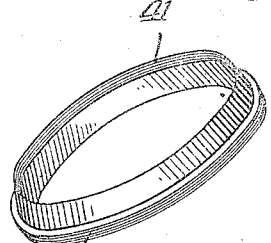
Figure 6 shows in perspective the group of the thin, flexible, metallic reeds.

If preferred, the novel and improved packing-gland may be mounted on the piston, and the piston or the cylinder may reciprocate and the other remain stationary, or both such members may slide back and forth relatively to one another, such a construction being presented in Fig. 5.

In such exemplification, the collar or mounting 140 in which the face-to-face, contacting layers of the flexible, metal laminations are secured, is separate from the bearing in which the piston 118 reciprocates, and such annular sleeve 140 and its cooperating member 191 surrounding the piston 118 are mounted on the latter in any approved or well-known manner and reciprocate therewith, although not so shown in detail.

The reed construction and its mounting is similar to that already described, except that it is reversed, outwardly for inwardly, and the reeds 410 project outwardly and longitudinally inwardly of the cylinder 111 toward the pressure therein.

In this case, of course, the outside diameter of the reeds is slightly greater than the inside diameter of the cylinder, the reeds are ground to free them from their stepped edges, and they are lapped in a different cylinder of the same diameter as that in which they are to be employed, so that when introduced into their cylinder, the reeds will be flexed slightly inwardly, and their cylinder-engaged edges will be parallel to the axis of the cylinder, their flexure combined with the fluid-pressure acting on the reeds maintaining them in proper and adequate pressure-sealing relation with the cylinder.

Whereas, in both instances, the reeds have been described as a group of nested or interfitted individual, thin, conical reeds or units, it is to be borne in mind that to take their place a suitable or proper flexible metal-ribbon may be wound helically to provide the required coacting plurality of overlying registered layers in face-to-face contact with one another provided means are used to prevent leakage of pressure at their ends.

It will be appreciated that the length of the operative life of the new packing-gland depends upon the number of reeds employed and these should have sufficient thickness to preclude collapse of the reed or reeds due to overstressing of the metal by reason of excessive pressure imposed thereon.

The number of reeds used also has a relation to the degree of smoothness of the surface on which they bear, in that if the surface is somewhat irregular the plurality of reeds is needed to conform to such surface contour.

In the normal airplane, it is very desirable or essential to have proper weight distribution, and, in order to correctly allocate or apportion the weight, a series of scales have heretofore been used to weigh the loads on the various scales or supporting means so that the weight can be properly located in the structure of the ship.

With the pressure-sealing glands previously used in the struts the friction has been very high so that it has been impossible to ascertain the weights without the use of scales.

In the new design incorporating the present invention, it is possible to employ a pressure-gauge at the top of each strut cylinder and from them instantly determine the amount of load in the various portions of the airplane and to enable the load to be shifted if necessary.

Suitable scales for this purpose are frequently not available at landing-fields and this advantage in the use of the new pressure-sealing means constitutes a materially desirable feature, and, at the same time, may well eliminate crash landings of airplanes due to improper weight distribution.

In addition to this specified reduction of friction in the pressure-sealing means, it is also to be noted that change in temperature has practically no influence on the operation of the novel gland, since the coefficients of expansion of the piston, cylinder and sealing-means are substantially the same, and a temperature range from minus 70° F. to 180° F. can occur without detrimental effect.

By reason of the positioning of this improved gland and its cooperating piston scraper a good clean lubricant is furnished to the cylinder bearing at all times.

This invention, as defined by the appended claim, is not necessarily limited and restricted to the details of structure illustrated and described since these may be varied within reasonable limits without departure from the heart and essence of the invention and without the loss or sacrifice of any of its material benefits and advantages.

Whereas above this invention has been set forth in connection with one particular form of strut it will, of course, be understood that struts vary somewhat in construction but no difficulty will be encountered in applying the present invention to the other styles of constructions, or to appliances of different character.

I claim:

In a pressure-sealing construction of the type incorporating a first member having a cylindrical chamber subjected to fluid-pressure, a companion cylindrical member coaxially occupying said chamber, said members having movement relative to one another, and fluid-pressure sealing-means mounted on one of said members and bearing edgewise at an oblique-angle on the cylindrical surface of the other member, said sealing-means including thin, truncated-cone shape, flexible reed-means, the novel improvement of a first element having a truncated-cone surface against which the acute-angle face of said reed-means bears for at least the major portion of its length and terminating short of the active edge of said reed-means, and a second element having a truncated-cone surface of the same inclination as and bearing against the obtuse-angle surface of said reed-means and located at such a distance from the active edge of said reed-means that the fluid-pressure acting on the exposed portion of the obtuse-angle face of said reed-means prevents the reed-means from buckling.

RALPH L. SKINNER.